June 19, 1934.  J. R. TAYLOR  1,963,426
DRAFT DEVICE
Filed Feb. 27, 1933  5 Sheets-Sheet 2
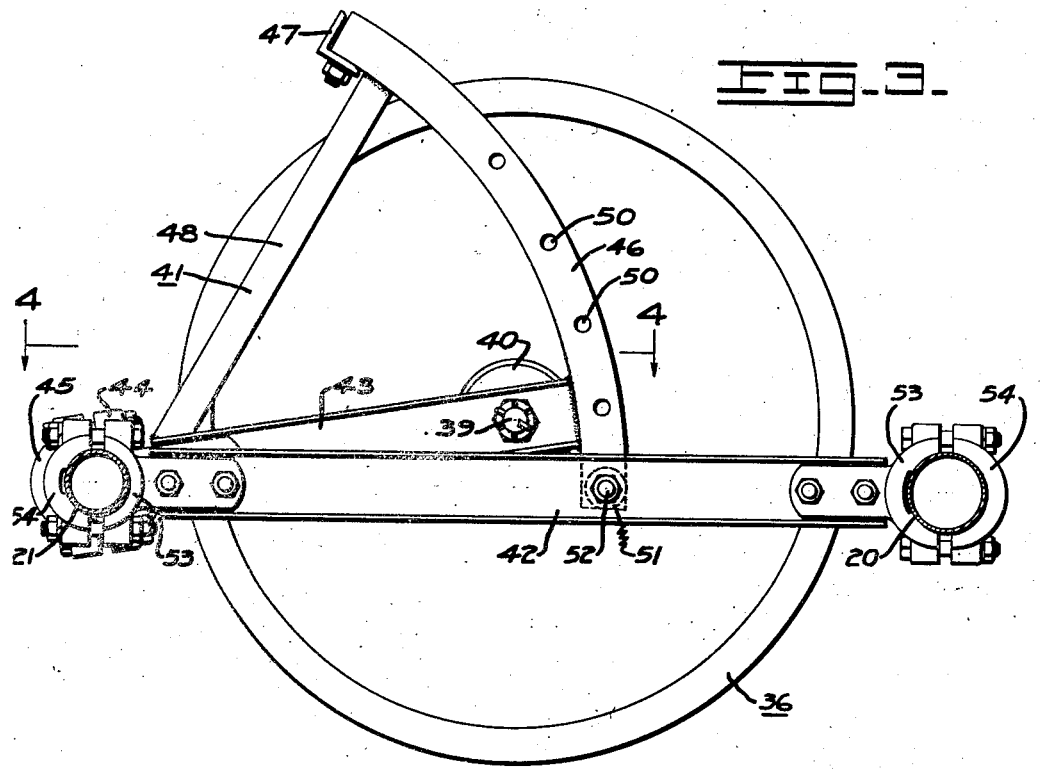
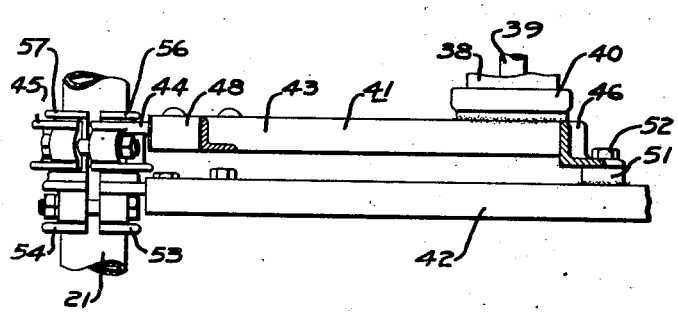
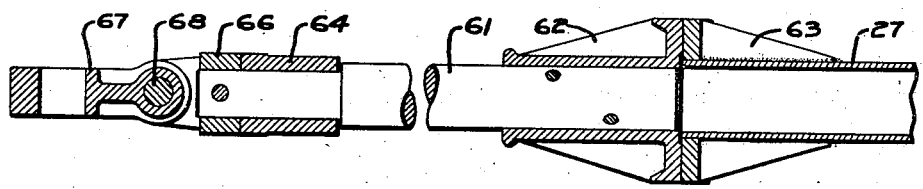
INVENTOR.
John R. Taylor
BY
ATTORNEY.

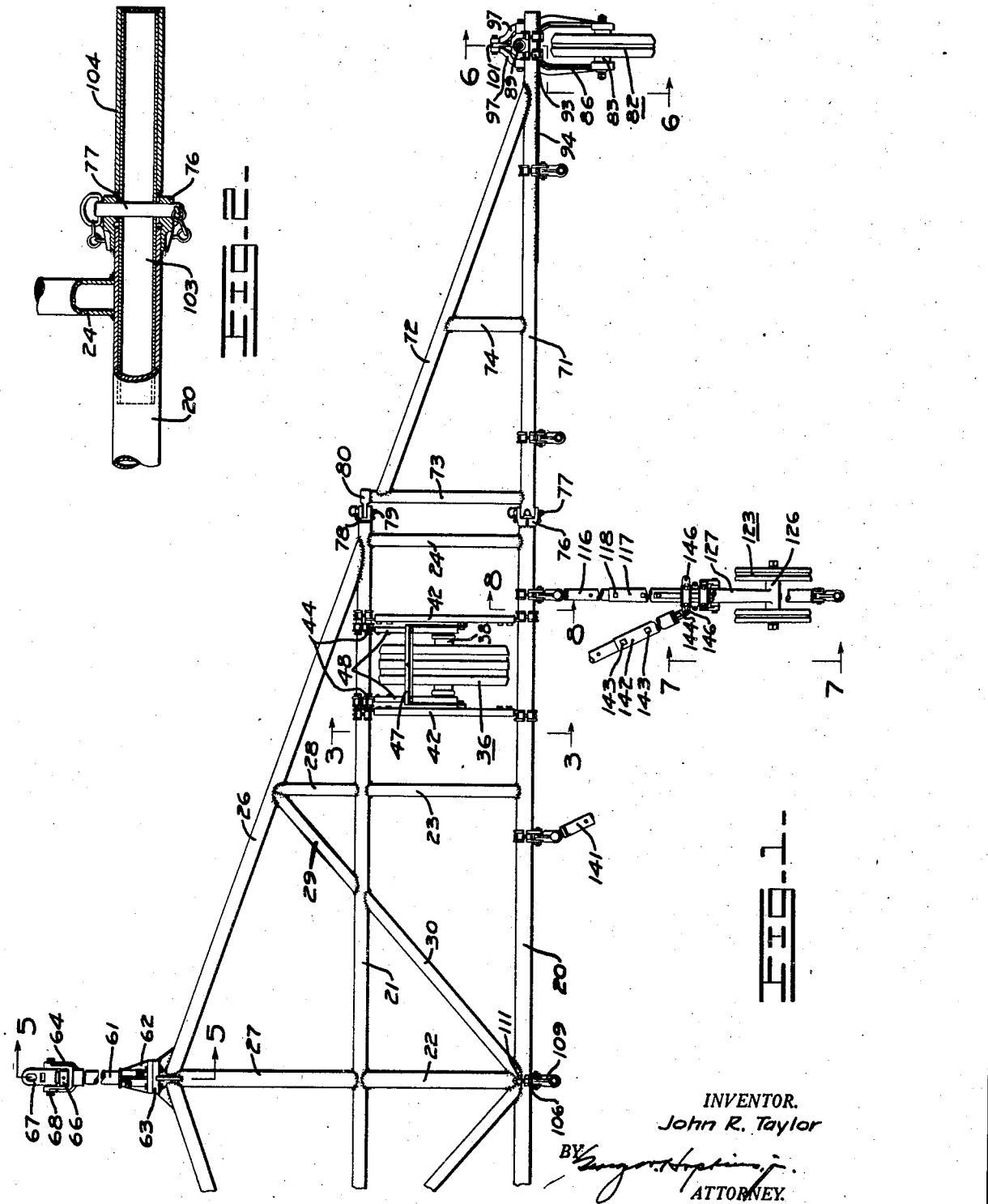

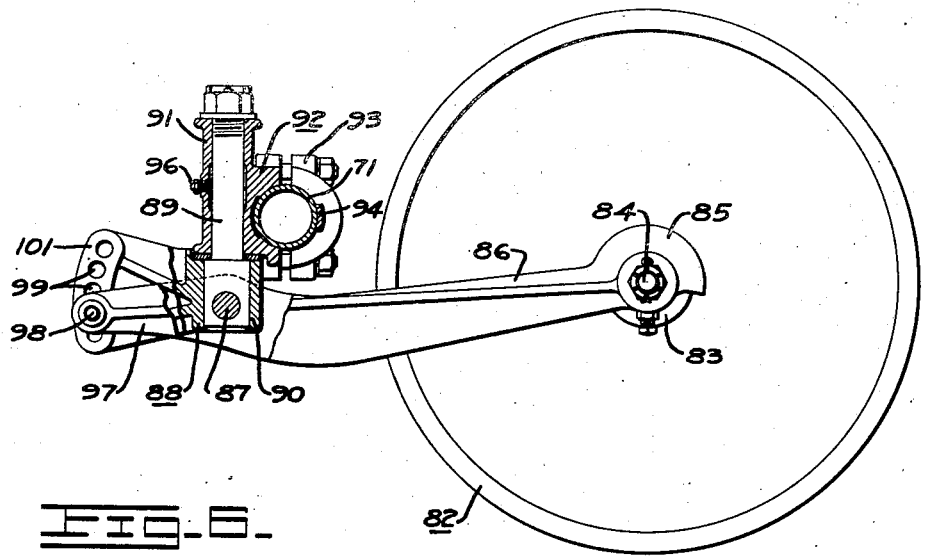
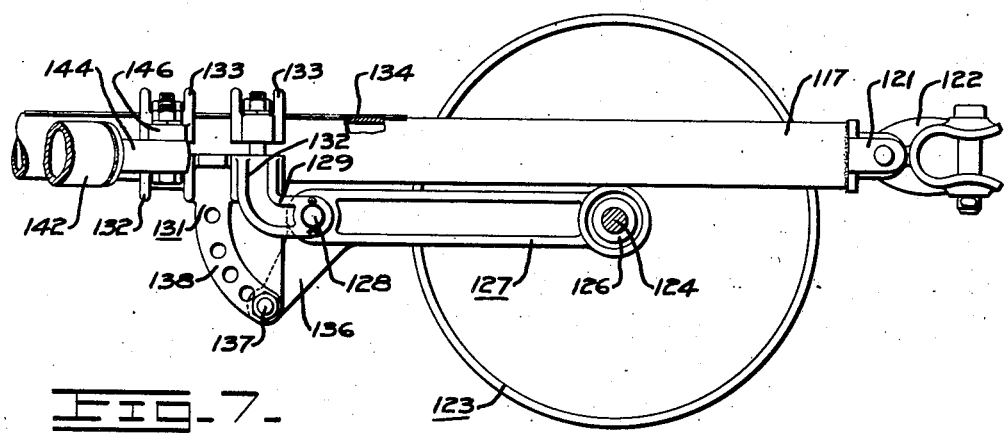
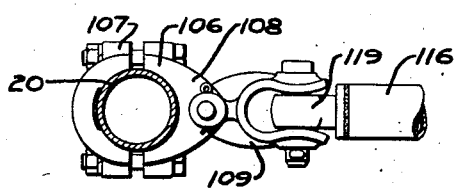

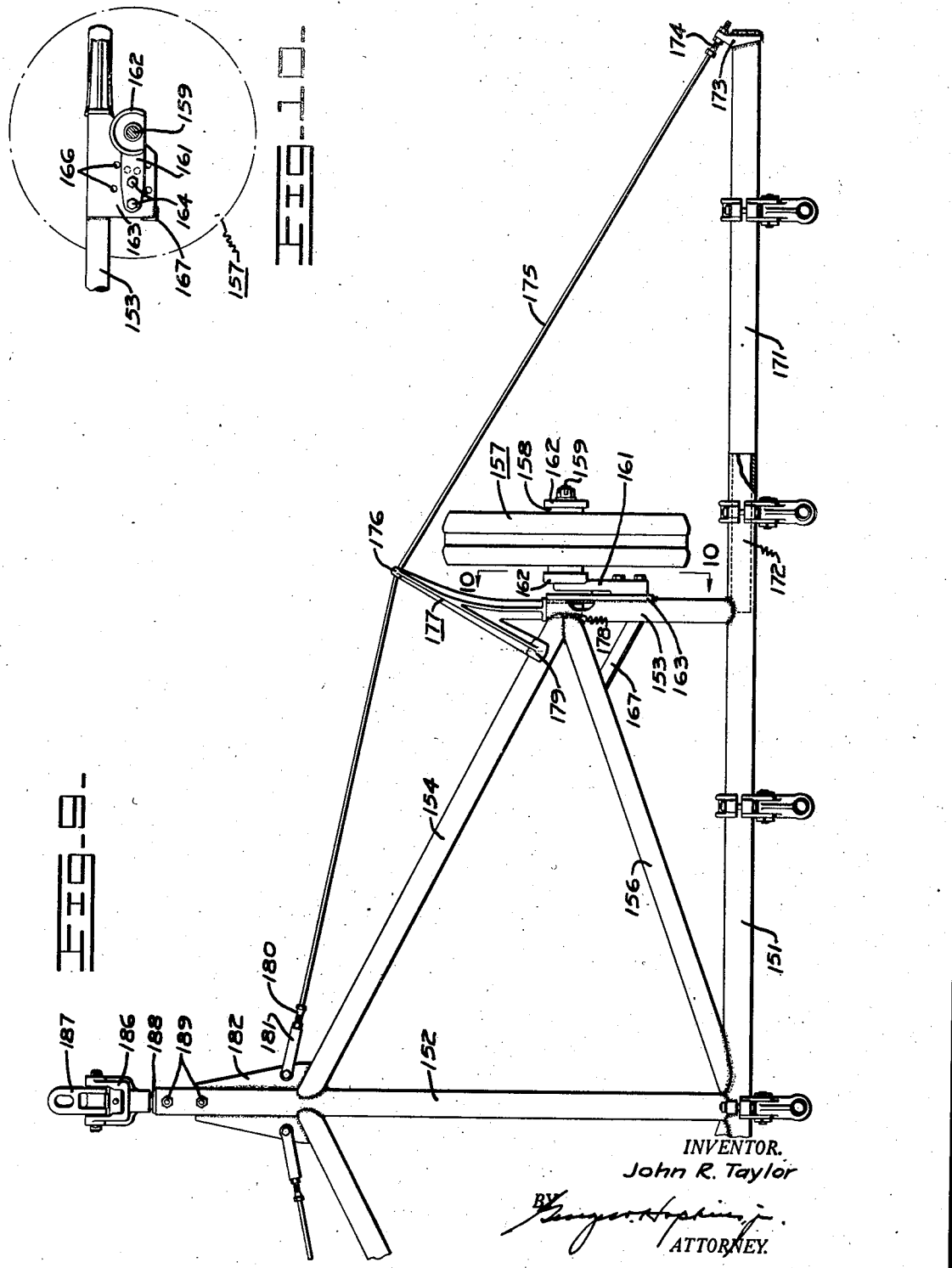

June 19, 1934. J. R. TAYLOR 1,963,426
DRAFT DEVICE
Filed Feb. 27, 1933    5 Sheets-Sheet 5
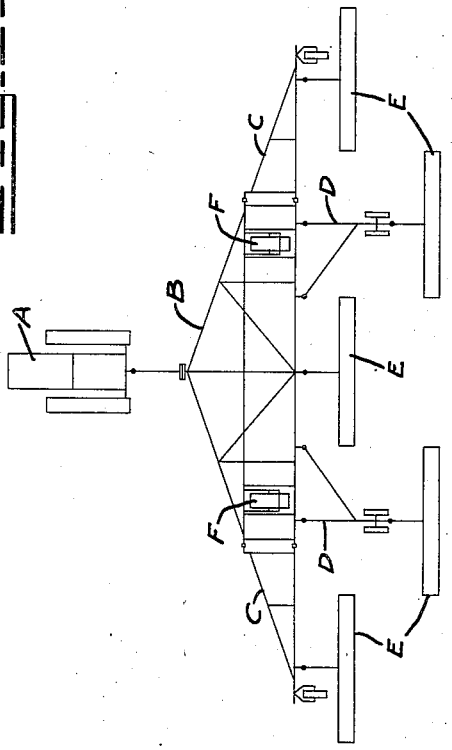
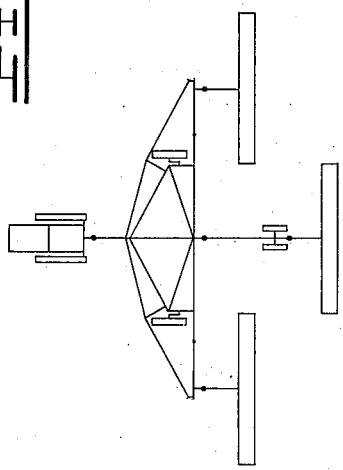
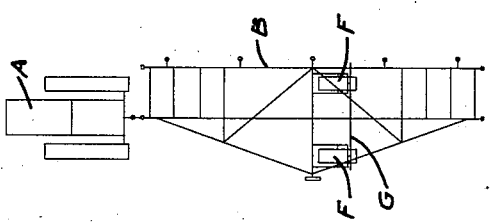
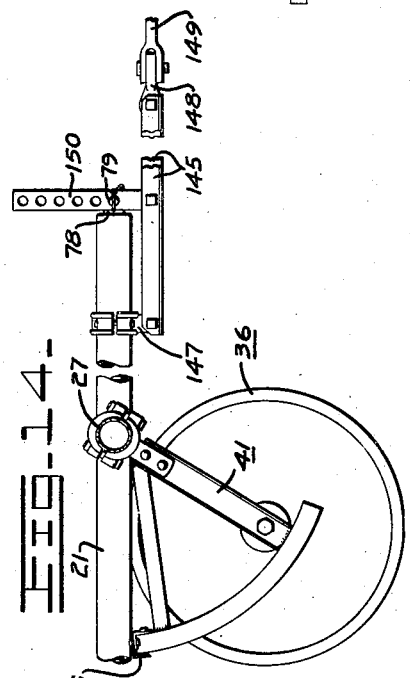
INVENTOR.
John R. Taylor
BY
ATTORNEY.

Patented June 19, 1934

1,963,426

UNITED STATES PATENT OFFICE 1,963,426

DRAFT DEVICE

John R. Taylor, Peoria, Ill., assignor to Caterpillar Tractor Co., San Leandro, Calif., a corporation of California Application February 27, 1933, Serial No. 658,777

4 Claims. (Cl. 97—233)

The present invention relates to draft devices, and more particularly to an implement hitch which is adapted to increase the usable lateral drawbar width of a tractor.

It is an object of the invention to provide an implement hitch which extends the usable lateral drawbar width of a tractor.

Another object of the invention is to provide an implement hitch which is adapted to variably extend the usable lateral drawbar width of a tractor.

Another object of the invention is to provide an implement hitch for a tractor which is adapted to follow an uneven ground contour.

Another object of the invention is to provide an implement hitch of a simple and sturdy construction.

Another object of the invention is to provide an implement hitch of a simple and sturdy construction, all of the frame members of said hitch being integrally joined.

Another object of the invention is to provide an implement hitch for a ground working apparatus which is of a rigid construction whereby the entire apparatus can be backed.

Another object of the invention is to provide an implement hitch which is supported on vertically adjustably wheels.

Another object of the invention is to provide an implement hitch having adjustable tongue trucks whereby a plurality of implements may be attached to the hitch in staggered relation.

Another object of the invention is to provide an implement hitch having extension trucks which are angularly adjustable with respect to the hitch frame.

Another object of the invention is to provide an extension truck for an implement hitch which is supported on vertically adjustable ground-engaging means.

Another object of the invention is to provide an implement hitch having a detachable draft connection with the traction vehicle.

Another object of the invention is to provide an implement hitch which has a wide usable lateral drawbar width in operation and a narrow width in transport.

Another object of the invention is to provide an implement hitch which is adapted to be variably connected to a traction vehicle.

Another object of the invention is to provide an implement hitch having detachable supporting wheels adapted for connection to the hitch frame at a plurality of joints to support the frame during operation and during transport.

Another object of the invention is to provide an implement hitch which can be readily disassembled for transport purposes.

Another object of the invention is to provide an implement hitch having a plurality of extensions adapted to be connected thereto to vary the effective drawbar width thereof.

Description of figures

Figs. 1 to 8 illustrate one form of the invention.

Fig. 1 is a partial plan view of the implement hitch provided with a hinged extension and an adjustable tongue truck.

Fig. 2 is a fragmentary view illustrating a second type of lateral extension for the implement hitch.

Fig. 3 is a side elevation of a support wheel for the hitch taken on the line 3—3 in Fig. 1.

Fig. 4 is a fragmentary plan view taken on the line 4—4 in Fig. 3.

Fig. 5 is a detail section illustrating the draft connection taken on the line 5—5 in Fig. 1.

Fig. 6 is a sectional view taken on the line 6—6 in Fig. 1 illustrating the adjustable support for the hinged extension.

Fig. 7 is a fragmentary left side elevation of the adjustable tongue truck taken on the line 7—7 in Fig. 1.

Fig. 8 is a fragmentary view taken on the line 8—8 in Fig. 1, showing the draft connection between the adjustable tongue truck and the hitch frame.

Figs. 9 and 10 illustrate a second form of the invention.

Fig. 9 is a partial plan view.

Fig. 10 is a fragmentary view illustrating the adjustable support taken on the line 10—10 in Fig. 9.

Figs. 11 to 13 are diagrammatic illustrations showing the implement hitches in use.

Fig. 11 illustrates the first form of the implement hitch with five implements attached thereto in staggered relation.

Fig. 12 illustrates the first form of hitch when placed in transport position.

Fig. 13 illustrates the second form of hitch with a plurality of implements attached thereto in staggered relation.

Fig. 14 is a fragmentary detail view showing a special draft connection for the hitch illustrated in Figs. 1–8 when it is placed in transport position.

Description of device

The form of the invention illustrated in Figs. 1 to 8 is described first. The frame includes a plurality of members which are angularly disposed with respect to each other to obtain maximum rigidity while preventing undue strain on any member of the frame in transmitting draft forces. As the two sides of the frame are similar, only one will be described in detail. The frame includes spaced transverse bars 20, 21 which are of the same length and parallel. At their center, said bars are connected by longitudinal center bar 22 welded therebetween, and respective bars 23, 24 parallel to bar 22 are welded between the right ends of said transverse bars 20, 21. Angularly disposed bar 26 is welded at its outer end to bar 21 adjacent the connection between said bar and bar 24, and is welded at its inner end to central bar 27 longitudinally aligned with bar 22. Longitudinal bar 28 is welded between angularly disposed bar 26 and bar 21 in alignment with bar 23. Angularly aligned braces 29, 30 are welded at their inner ends to bar 21 and at their respective outer ends to bar 26 and bar 20 adjacent the connections thereof with respective bars 28 and 22. It is believed to be obvious from the foregoing description that the hitch frame comprises similar trapezoidal sections having a common long base which is the central pull bar of the frame.

The frame is provided with a pair of vertically adjustable supporting wheels detachably connected thereto adjacent its ends. Only one of said wheels will be described in detail. Wheel 36 (Figs. 1 and 3) comprises a tire suitably connected to hub 38. Said hub 38 is journaled on axle 39 (Fig. 3) mounted in adjustable framework 41. Overhanging collar 40 (Fig. 4) welded on channel 43 protects the joint between hub 38 and axle 39. Said framework 41 is pivotally and adjustably connected to longitudinal frame members 42 and comprises similar spaced channels 43 (Figs. 3 and 4). Each channel 43 is secured at its front end to clamp 44 having cap 45 bolted thereto, and at its rear end to arcuate angle 46. Said angles 46 are connected at their upper ends by cross angle 47 and an angle 48 is welded between the upper end of each arcuate angle 46 and the front end of corresponding channel 43. Said clamps 44 (Fig. 1) provide a pivotal connection as hereinafter described for the front end of framework 41, and said framework is oscillable about the axis of this connection to adjust wheel 36 vertically with respect to the frame. Each arcuate angle 46 (Fig. 3) is provided with a plurality of apertures 50 which are adapted to be aligned with an apertured boss 51 (Fig. 4) welded on frame member 42, bolt 52 serving to connect framework 41 in its adjusted position with respect to the frame member 42. As shown in Figs. 3 and 4, each frame member 42 is provided at its ends with clamps 53 having caps 54 bolted thereto and engaging repective bars 20, 21. Thus said frame members 42 are detachably mounted between said bars 20 and 21 (Figs. 1 and 3). Each clamp 53 (Fig. 4) and cap 54 therefor at the front end of frame members 42 are provided with respective extensions 56, 57 to provide a bearing surface for clamp 44 and cap 45. It is believed to be evident from the foregoing description that adjustment of framework 41 with respect to frame members 42 serves to adjust wheel 36 with respect to the hitch frame whereby the frame is supported at a selected height from the ground. The left end of the frame has a similar adjustable wheeled support.

A detachable draft connection is provided for the hitch frame and said connection comprises pole 61 (Figs. 1 and 5) having connection 62 bolted on the rear end thereof and abutting connection 63 welded on longitudinal bar 27 to which said connection is adapted to be bolted. Fork 64 is pivoted on the reduced forward end of pole 61 being held thereon by collar 66 and providing a mounting for draft link 67 on pin 68 pivoted in said fork. From the foregoing description it is seen that a detachable draft connection is provided for the hitch frame and that the draft link is mounted for universal movement about the intersection of the axes of pole 61 and pin 68. This universal connection permits relative movement between the tractor and the hitch during travel over uneven ground.

Hinged extensions are provided at each end of the hitch frame to increase the usable lateral drawbar width of the hitch. These extensions have adjustable wheel supports at their outer ends and the hinged connections to the hitch frame permit relative oscillation between the frame and the extension when the hitch is moving over uneven ground, whereby the implement can be effectively used and will follow the contour of the ground being traversed. As the extension on each end is similar, only one will be described in detail. The extension includes transverse bar 71 (Fig. 1) adapted to be aligned with bar 20 of the frame, and angularly disposed bar 72 is adapted to be aligned with bar 26 of the frame. Said bars 71, 72 have a welded connection adjacent their outer ends and are welded to longitudinal bar 73 at their inner ends. Brace 74 connects said bars 71, 72 intermediate their length.

The hinged connection between the extension and the frame comprises aligned pivotal connections between bars 20, 21 of the frame and bars 71, 73 of the extension. The connection between bars 20 and 71 includes fork 76 welded on bar 20, and pin 77 passing through the apertured extensions of said fork 76 and the apertured end of bar 71. The connection between bars 21 and 73 comprises fork 78 welded on bar 21 and pin 79 passing through the apertured extensions of said fork 78 and apertured arm 80 welded on bar 73. Said pins 77, 79 have aligned axes, and have chains connecting the ends thereof to hold them in place.

An adjustable wheeled support is provided at the outer end of the extension. Wheel 82 (Figs. 1 and 6) is provided with hub 83 journaled on axle 84 mounted in the forked extensions of fork 86. Each extension of fork 86 has overhanging integral collar 85 (Fig. 6) protecting the joint between hub 83 and axle 84. Fork 86 adjacent its rear end is pivoted on shaft 87 mounted in bracket 88. Said shaft 87 passes through the enlarged lower end of bolt 89 mounted in vertical apertured boss 90 of said bracket 88. The reduced portion of bolt 89 is journaled in vertical bearing portion 91 of clamp 92 having cap 93 bolted thereto. Clamp 92 and cap 93 engage bar 71 to provide a mounting for wheel 82 and relative movement between bar 71 and said cap is prevented by strip 94 welded on bar 71 and engaging a notch in said cap 93. From the foregoing description it is seen that wheel 82 has a universal connection with the extension about the intersection of the axes of shaft 87 and bolt 89. This universal connection is lubricated through oil fitting 96 in bearing 91.

An adjustable connection is provided between fork 86, which carries wheel 82, and bracket 88. Front extensions 97 of fork 86 have aligned apertures adapted to receive bolt 98, which also passes through any one of a plurality of apertures 99 in flange 101 of bracket 88. It is believed evident from the foregoing that oscillation of fork 86 about the axis of shaft 87 serves to adjust the height of the extension with respect to the ground.

A second type of extension is provided at each end of the hitch frame which is adapted to be used interchangeably with the above-described extension, depending upon the desired width of the hitch. The second type of extension comprises bar 103 (Fig. 2) which is adapted to be inserted within bar 20 and which is reinforced in the portion extending beyond bar 20 by sleeve 104 welded thereon. Said bar 103 is held in place by pin 77 which passes through fork 76 and said bar 103. A similar extension is provided for the left end of the hitch frame.

A plurality of draft connections are provided which are adapted to be attached at any desired point along rear bar 20 of the hitch frame and rear bar 71 of the hitch extension to provide a means for attaching the implements to the frame. Each of these connections is similar and only one will be described in detail. As shown in Fig. 8, clamp 106 has cap 107 bolted thereto and engaging bar 20. Clamp 106 has apertured ears 108 in which draft link 109 is pivotally mounted. It is apparent that this draft connection can be clamped in any desired location along bar 20 or bars 71. A permanent draft connection is provided at the center of the frame including a clamp 106 (Fig. 1) and draft link 109 similar to those heretofore described and adapted to be connected to similar apertured bosses 111 welded to the top and bottom of bar 20.

It is often desirable to arrange the implements in staggered relation and for this purpose an extensible adjustable tongue truck is provided which is adapted to form an extensible connection whereby certain implements can be attached at a greater distance from the hitchframe than those connected directly to the draft connections thereon. The extensible truck includes draft pole 116 (Fig. 1) extending within hollow draft pole 117 and adapted to be variously connected thereto by bolts 118 to adjust the length of the extensible draft pole. At its front end, pole 116 (Fig. 8) is provided with eye 119 for connection to one of clamps 106. At its rear end, pole 117 (Fig. 7) has fork 121 welded therein, and clevis 122 pivotally mounted in said fork 121 provides means for connecting the truck to an implement.

A wheel assembly is provided for adjustably supporting the extensible draft poles at selected heights from the ground. Wheels 123 (Figs. 1 and 7) are mounted on axle 124 in hub 126 of connection 127. Said connection 127 is provided with a pivotal and an adjustable connection with draft pole 117. The pivotal connection includes pin 128 (Fig. 7) which passes through the apertured end of support 127 and the apertured ends of fork 129 integral with saddle 131. Said saddle 131 is provided with a pair of clamped portions 132 engaging pole 117 and having respective caps 133 bolted thereto. Said caps 133 are similar to cap 93 heretofore described and engage strip 134 welded on pole 117 to prevent rotation of saddle 131 with respect thereto. The adjustable connection between support 127 and saddle 131 includes arm 136 integral with support 127 and having its end apertured to receive bolt 137 which also engages any one of a plurality of spaced apertures in similar spaced arcuate portions 138 of saddle 131. By removing bolt 137, arm 136 can be oscillated about the axis of pin 128 to align the apertures therein with any selected apertures in arcuate portions 138 whereby the height of the extensible draft pole from the ground may be varied.

An adjustable brace is provided between the truck and the frame of the hitch whereby the truck is maintained in its angularly adjusted position with respect to the frame. Draft pole 141 (Fig. 1) similar to pole 116 is received within hollow draft pole 142 and is adapted to be variously connected thereto by bolts 143 adapted to pass through selectively aligned apertures in said draft pole. Draft pole 141 is adapted to be connected to rear bar 20 of the frame, similarly to draft pole 116. Draft pole 142 is provided at its rear end with eye 144 (Fig. 7) which is adapted to be connected to either of apertured extensions 146 of front cap 133. Draft poles 141, 142 not only serve to maintain the truck in its adjusted position, but also provide an additional draft connection. If the truck is attached to the right side of the hitch frame, pole 142 is connected to left-hand extension 146, and if the truck is connected to left side of the frame, said pole 142 is connected to right-hand extension 146.

In Fig. 11, the hitch is illustrated with a plurality of implements attached thereto in staggered relation. In this figure, tractor A has its usable lateral drawbar width extended by means of hitch B, having extensions C connected to each end. Extensions C and adjustable tongue trucks D enable the connection of a plurality of implements E in staggered relation whereby a strip wider than the entire width of the hitch can be cultivated or seeded during a single trip of the apparatus.

In Fig. 12, the hitch is shown arranged for transport from one place to another, the detachable wheel assemblies F being removed from the position shown in Fig. 11 and attached as shown in Fig. 12 to the central pull bar to permit travel of the apparatus with a width slightly greater than the width of tractor A. In this transport position the frame rests on a special crosspiece G which is attached to the rear ends of wheel assemblies F, the front ends of said assemblies being attached to the central pull bar.

A special adjustable draft connection is provided for the hitch when it is arranged for transport to compensate for any difference in height between the drawbar of the traction vehicle and the end of the implement frame. Spaced angles 145 (Fig. 14) are adapted to be attached to rear bar 21 adjacent an end thereof by means of clamp 147 secured between their rear ends. Eye 148, secured to the front ends of said angles, is connected to drawbar 149 of the traction vehicle by means of a suitable draft pin. Apertured strap 150, secured between said angles 145 intermediate their ends, is adapted to be variously connected to fork 78, heretofore described, by means of pin 79. Fig. 14 also shows one of the wheel assemblies in transport position, framework 41 being attached at one end to central bar 27 and at the other to crosspiece G, which is beneath the hitch to provide a support therefor. Thus either end of the hitch can be attached to traction vehicles having a wide range of drawbar heights. In transporting the hitch the extensions and the adjustable tongue trucks are carried on the hitch frame. It is believed that the advantages of this arrangement whereby the hitch can be readily placed in transport position are obvious.

The second form of the invention disclosed herein is similar to that above described, but is intended for use where a shorter usable drawbar width is required.

The frame of the second form of the invention (Fig. 9) includes rear transverse bar 151 and longitudinal bar 152 having its rear end welded to bar 151 centrally thereof. Adjacent its right end, bar 151 has short bar 153 welded thereto parallel to bar 152. Said bar 153 is connected to bar 152 adjacent the forward end thereof by angularly disposed bar 154 welded thereto. Brace 156 has its inner end welded to bar 151 centrally thereof and its outer end to bars 153, 154. The left side of the frame is similarly constructed.

Vertically adjustable wheels are provided for supporting the hitch frame at selected heights from the ground. Wheel 157 has hub 158 journaled on axle 159 secured to crank 161. Overhanging collars 162 (Figs. 9 and 10) protect the joints between hub 158 and axle 159. Said crank 161 is adapted to be variably connected to plate 163 (Fig. 10) by means of bolts 164 passing through said crank 161 and adapted to be selectively engaged with any one of a plurality of apertures 166 in said plate 163. Plate 163 is welded to longitudinal bar 153 along its upper edge and bracing angle 167 connects the lower edge of said plate to brace 156 (Fig. 9). A similar wheeled support is provided for the left end of the frame.

Extensions are provided for increasing the effective drawbar width of the hitch frame. The right-hand extension comprises bar 171 having its reduced inner end 172 received within bar 151, and having eye 173 welded thereto at its outer end. Screw 174 suitably mounted in eye 173 has cable 175 connected thereto. Said cable 175 extends inwardly through eye 176 of brace 177 which has a cylindrical portion 178 extending within bar 153 and saddle 179 engaging bar 154. The inner end of cable 175 is connected by screw 180 to yoke 181 pivoted in bracing plate 182 welded to bar 152 and bar 154. It is believed to be obvious from the foregoing description that the extension is mounted on its frame solely by means of cable 175 and its above-described connections. The extension at the left end of the frame is similarly mounted.

A detachable draft connection is provided for the hitch frame and said connection comprises fork 186 and draft link 187 similar to fork 64 and link 67 heretofore described and similarly mounted on draft pole 188. Said draft pole 188 is secured within bar 152 by bolts 189.

Fig. 13 illustrates diagrammatically the second form of the invention having a plurality of implements connected thereto in staggered relation.

I, therefore, claim as my invention:

1. A device for adapting a drawbar of a traction vehicle for connection with loads of varying widths with respect to the vehicle, comprising a frame having sides of different lengths, said frame being adapted for connection to said vehicle with the sides of greater length disposed transversely of said vehicle during use of the device for draft purposes, and being adapted for connection to said vehicle with the sides of shorter length disposed transversely of said vehicle during transport of the device, and detachable wheeled supports for said frame adapted for connection thereto in different positions in accordance with the alignment of said sides with respect to said vehicle.

2. A device for adapting a drawbar of a traction vehicle for connection with loads of varying widths with respect to the vehicle, comprising a frame, and detachable wheeled supports for said frame, said supports being adapted for connection to said frame in any one of a plurality of positions thereon to adapt said device for different operations.

3. A device for adapting a drawbar of a traction vehicle for connection with loads of varying width with respect to the vehicle, comprising a frame having sides of different lengths, wheeled supports for said frame adapted for attachment thereto in different positions when different sides of said frame are in alignment with said vehicle, said supports maintaining said frame at different heights when connected at said different positions on said frame, means on said frame for connecting any one of a plurality of said sides to said drawbar, and means for compensating for different heights of said frame and said drawbar from the ground resulting from said differing alignments.

4. A device for adapting a drawbar of a traction vehicle for connection with loads of varying width with respect to the vehicle, comprising a frame having sides of differing length, wheeled supports for said frame adapted for attachment thereto in different positions when different sides of said frame are in alignment with said vehicle, said supports being adjustable to vary the height of said frame with respect to the ground when connected in one position said frame, and an adjustable draft connection for compensating for differing heights of said frame and said traction vehicle drawbar from the ground when said supports are connected to said frame in another position.

JOHN R. TAYLOR.